(12) United States Patent
Desanti

(10) Patent No.: US 12,549,608 B2
(45) Date of Patent: Feb. 10, 2026

(54) CENTRALIZED SECURITY POLICY ADMINISTRATION USING NVMe-oF ZONING

(71) Applicant: DELL PRODUCTS L.P., Round Rock, TX (US)

(72) Inventor: Claudio Desanti, Santa Cruz, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 373 days.

(21) Appl. No.: 17/384,639

(22) Filed: Jul. 23, 2021

(65) Prior Publication Data

US 2023/0035799 A1    Feb. 2, 2023

(51) Int. Cl.
*H04L 29/06*    (2006.01)
*H04L 9/40*    (2022.01)

(52) U.S. Cl.
CPC ............ *H04L 63/205* (2013.01); *H04L 63/08* (2013.01)

(58) Field of Classification Search
CPC ...... H04L 63/205; H04L 63/08; H04L 63/166
USPC .......................................................... 726/1
See application file for complete search history.

(56) References Cited

U.S. PATENT DOCUMENTS

| 11,803,453 | B1* | 10/2023 | Bunker | G06F 3/0659 |
| 2009/0006501 | A1 | 1/2009 | Bharadwaj | |
| 2013/0117766 | A1* | 5/2013 | Bax | G06F 9/4401 719/323 |
| 2013/0304951 | A1 | 11/2013 | Goel | |
| 2018/0081558 | A1 | 3/2018 | Ish | |
| 2019/0102568 | A1* | 4/2019 | Hausauer | H04L 9/3242 |
| 2020/0409893 | A1* | 12/2020 | Puttagunta | H04L 69/16 |
| 2021/0391988 | A1* | 12/2021 | Bedau | H04B 10/27 |
| 2022/0046058 | A1* | 2/2022 | Sampathkumar | H04L 67/55 |
| 2022/0166831 | A1* | 5/2022 | Guendert | H04L 49/357 |
| 2022/0377054 | A1* | 11/2022 | Shukla | H04L 9/3226 |

OTHER PUBLICATIONS

"Fibre Channel," Generic Services—7 (FC-GS-7), [online], [Retrieved Feb. 17, 2022]. Retrieved from Internet <URL:https://standards.incits.org/apps/group_public/download.php/81982/T11-2016-300v0.pdf> INCITS working draft proposed American National Standard for Information Technology, 2016. (397pgs).

* cited by examiner

*Primary Examiner* — Noura Zoubair
(74) *Attorney, Agent, or Firm* — BAUGH LAW, LLC

(57) ABSTRACT

Systems and methods extend Non-Volatile Memory express over Fabric (NVMe-oF) zoning to enable security policy administration and authentication of NVMe-oF entities in a centralized manner without requiring per-connection provisioning administered by a Centralized Discovery Controller (CDC). In various embodiments a zone configuration is defined that represents access control rules, which determine which entities can connect with each other, and that may be augmented by specifying in a zone attribute whether members of a zone should authenticate or authenticate and establish a secure channel between themselves. Each entity may be configured with a per-entity global security policy that comprises a security credential and that enables an authentication and/or a secure channel communication between entities. Once an entity issues a Get Log Page request to the CDC to discover other entities, the CDC may provide a list of such entities and specify whether authentication and/or secure channel communication should be performed.

20 Claims, 13 Drawing Sheets

1000

```
┌─────────────────────────────────────────────┐
│ AT A CENTRALIZED DISCOVERY CONTROLLER (CDC) IN A │
│     NETWORK THAT COMPRISES NVMe-oF ENTITIES     │
│      COMPRISING NVMe-oF HOSTS AND NVMe-oF       │
│   CONTROLLERS, DEFINE A ZONE CONFIGURATION      │
│  REPRESENTING A SET OF ACCESS CONTROL RULES     │──⌐ 1005
│   THAT DETERMINE WHICH HOSTS CAN CONNECT TO     │
│   WHICH CONTROLLERS, EACH ENTITY HAVING BEEN    │
│  CONFIGURED WITH A PER-ENTITY GLOBAL SECURITY   │
│  POLICY THAT COMPRISES A SECURITY CREDENTIAL AND│
│     ENABLES AN AUTHENTICATION AND/OR A SECURE   │
│      CHANNEL COMMUNICATION BETWEEN ENTITIES     │
└─────────────────────────────────────────────┘
                        │
                        ▼
┌─────────────────────────────────────────────┐
│    ONCE AN NVMe-oF ENTITY ISSUES A Get Log Page │
│    REQUEST TO DISCOVER THOSE ENTITIES THAT THE  │
│  NVMe-oF ENTITY CAN ESTABLISH A COMMUNICATION   │
│   WITH ACCORDING TO THE ZONE CONFIGURATION,     │──⌐ 1010
│   PROVIDE TO THE NVMe-oF ENTITY A LIST OF THOSE │
│     ENTITIES AND TRANSPORT INFORMATION THAT     │
│  SPECIFIES THE ENABLED AUTHENTICATION OR SECURE │
│              CHANNEL COMMUNICATION              │
└─────────────────────────────────────────────┘
```

CENTRALIZED SECURITY POLICY ADMINISTRATION USING NVMe-oF ZONING

BACKGROUND

A. Technical Field

The present disclosure relates generally to implementing security policies in information handling systems. More particularly, the present disclosure relates to using Non-Volatile Memory express over Fabric (NVMe-oF) zoning for access control and centralized security policy administration.

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Security concerns provide a growing motivation for control networks such as storage networks to offer data integrity and confidentiality features. Centralized security policy administration for access control as countermeasures to security threats, such as spoofing or eavesdropping, has been a problem with no general solution for both Internet Small Computer Systems Interface (iSCSI) and Fibre Channel applications. Both require explicit administration of end point devices, which is not scalable. As a result, security is rarely deployed in both iSCSI and Fibre Channel based storage area networks (SANs). Zoning for NVMe-oF is currently defined as a method for specifying connectivity access control information on a Centralized Discovery Controller (CDC) of an NVMe-oF environment, and not as a method of distributing security policies. Even in Fibre Channel applications, zoning is not used as a method for distributing security policies.

Accordingly, it is highly desirable to find new, more efficient security policy administration systems and methods.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

FIG. 3 is an example of a Diffie-Hellman Hash-Based Message Authentication Code Challenge Handshake Protocol (DH-HMAC-CHAP) authentication transaction according to an authentication protocol defined for NVMe-oF.

FIG. 10 is a flowchart of an illustrative centralized access control process for authenticating entities in an NVMe-oF environment in accordance with various embodiments of the present disclosure.

DETAILED DESCRIPTION OF EMBODIMENTS

Figure 1:
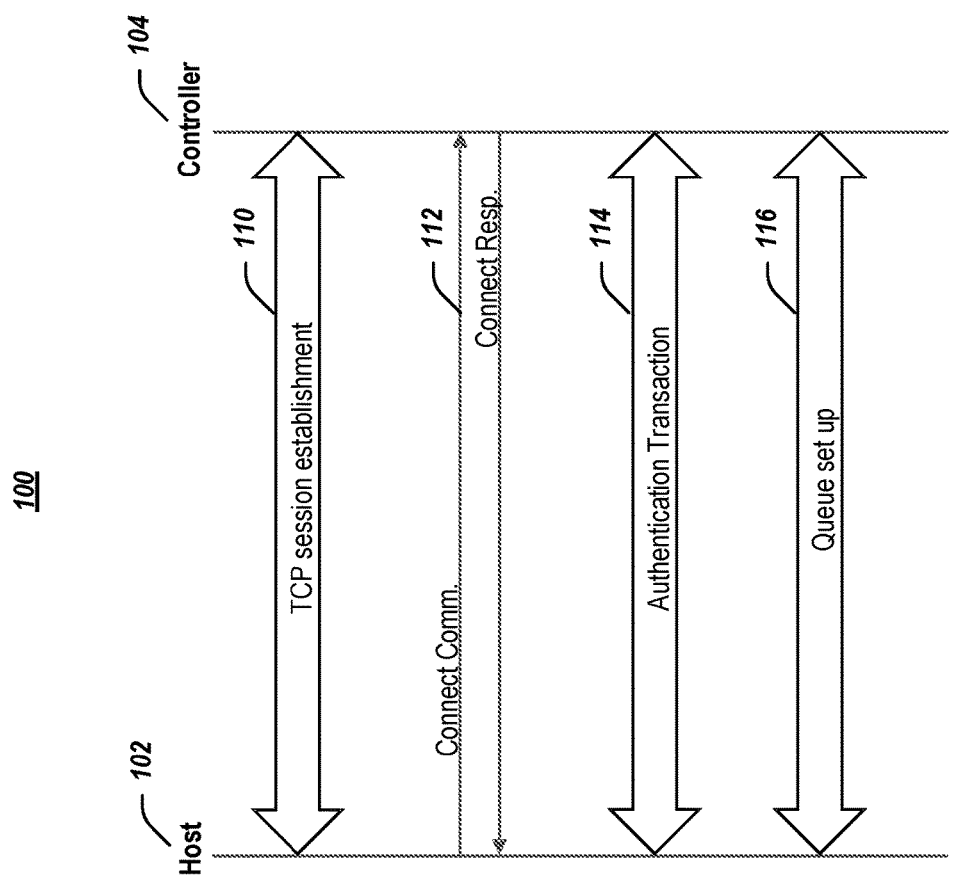
FIG. 1 ("FIG. 1") depicts a common NVMe-oF authentication transaction.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion components may be described as separate functional units, which may comprise sub-units, but those skilled in the art will recognize that various components, or portions thereof, may be divided into separate components or may be integrated, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be included in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms, and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell."

It shall also be noted that although embodiments described herein may be within the context of the NVMe-oF protocol, aspects of the present disclosure are not so limited. Accordingly, the aspects of the present disclosure may be applied or adapted for use in other contexts.

FIG. 1 shows a common NVMe-oF authentication transaction between an NVMe-oF host and an NVMe-oF controller, e.g., as specified by TP 8006 that directs the manner in which an NVMe-oF host and an NVMe-oF controller may authenticate each other. As depicted in FIG. 1, once a TCP session is established 110, a Connect exchange 112 is performed to set up an NVMe queue and to associate host 102 with controller 104. After successful completion of the Connect command, the host performs an authentication transaction 114 with the controller to authenticate the endpoints. Then the NVMe queue 116 is ready for subsequent operations.

TP 8006 further defines how to leverage an authentication transaction to compute an ephemeral Pre-Shared Key (PSK) that can be used to establish a secure TLS channel between NVMe-oF entities, such as host 102 and controller 104.

Figure 2:
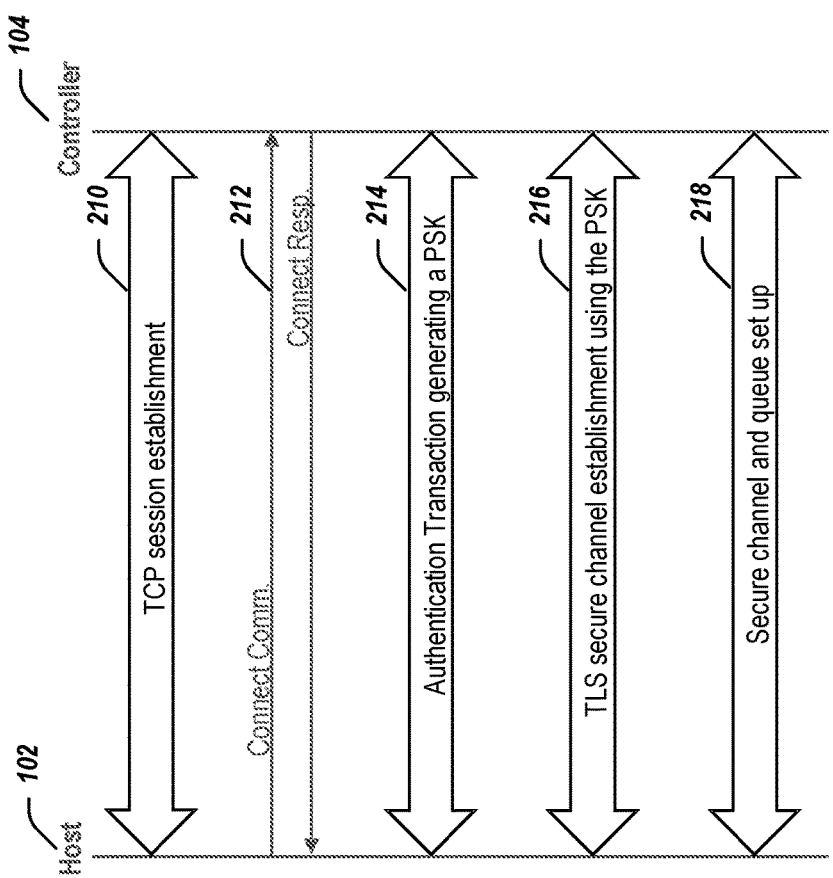
FIG. 2 depicts an NVMe-oF authentication transaction followed by a Transport Layer Security (TLS) secure channel establishment.

As demonstrated in FIG. 2, once a TCP session 210 has been established and a Connect exchange 212 is performed to set up the NVMe queue and associate host 102 with controller 104, similar to FIG. 1, host 102 performs an authentication transaction 214 with controller 104. The authentication transaction 214 generates a pre-shared key (PSK) between host 102 and controller 104. The PSK is used to perform a TLS negotiation 216 and to establish a secure channel. Finally, secure channel and queue 218 are set up and ready for subsequent operations.

Figure 3:
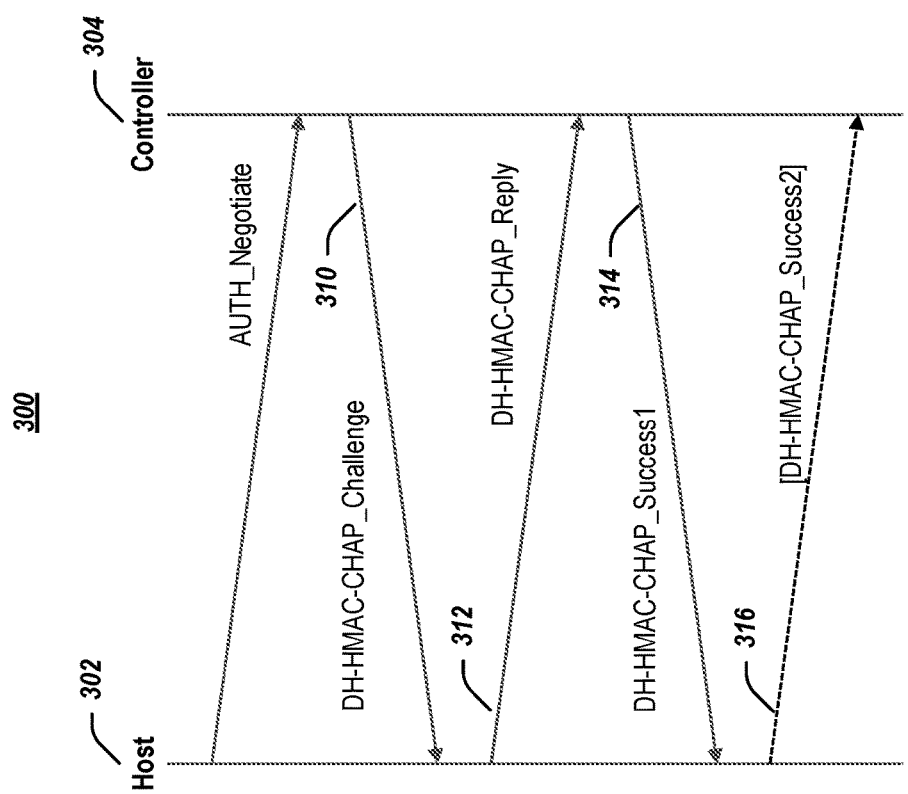

FIG. 3 is an example of a DH-HMAC-CHAP authentication transaction according to an authentication protocol defined for NVMe-oF. In order for DH-HMAC-CHAP to properly operate, each NVMe-oF entity, here host 302 and controller 304, is provisioned with a secret key $K_h$ and $K_c$, respectively. The secret key is used to compute a response to a challenge sent by the other authenticating entity, e.g., by using various hash transformations.

In addition, an NVMe-oF entity needs to know the key of the other authenticating entity that it is authenticating in order to verify the response. Therefore, provisioning DH-HMAC-CHAP on an NVMe-oF entity implies configuring that entity's key $K_e$ and the keys of all other entities that the entity could authenticate with. Stated differently, provisioning DH-HMAC-CHAP on an NVMe-oF entity requires provisioning on a per-connection basis.

As depicted in FIG. 3, for a unidirectional challenge/response protocol, controller 304 sends a challenge in the DH-HMAC-CHAP_Challenge message 310 to host 302. Host 302 computes a response in the DH-HMAC-CHAP_Reply message 312. Controller 304 verifies the response (or delegates verification). If the verification is successful Controller 304 sends a DH-HMAC-CHAP_Success1 message 314 to host 302.

For bidirectional authentication, host 302 may send a challenge to controller 304 in the DH-HMAC-CHAP_Reply message 312, to which controller 304 computes a response sent in the DH-HMAC-CHAP_Success1 message 314. Host 302 verifies the response (or delegates verification) to unidirectionally authenticate controller 304. If the verification is successful Host 302 sends a DH-HMAC-CHAP_Success2 message 316 to controller 304.

Verification comprises controller 304 computing a response and checking whether it matches the received response by host 302 and, conversely, host 302 computing a response and checking whether it matches the response received from controller 304. To their respective responses, controller 304 needs to know secret key $K_h$ and host 302 needs to know secret key $K_c$.

Since an NVMe-oF entity needs to store its own key and the keys of all entities that it may communicate with, provisioning secret keys on a per-connection basis does not lend itself to upscaling. This presents both a security concern and a management problem because not only may a single compromised node allow an attacker to gain access to all configured keys, but also the sheer number of keys to be configured per NVMe-oF entity poses a security risk.

In contrast, a much more scalable approach may be achieved when authentication verification is delegated to an Authentication Verification Entity (AVE)—typically a centralized authentication verification server that holds all keys or key pairs used in an NVMe-oF environment in a centralized database.

Figure 4:
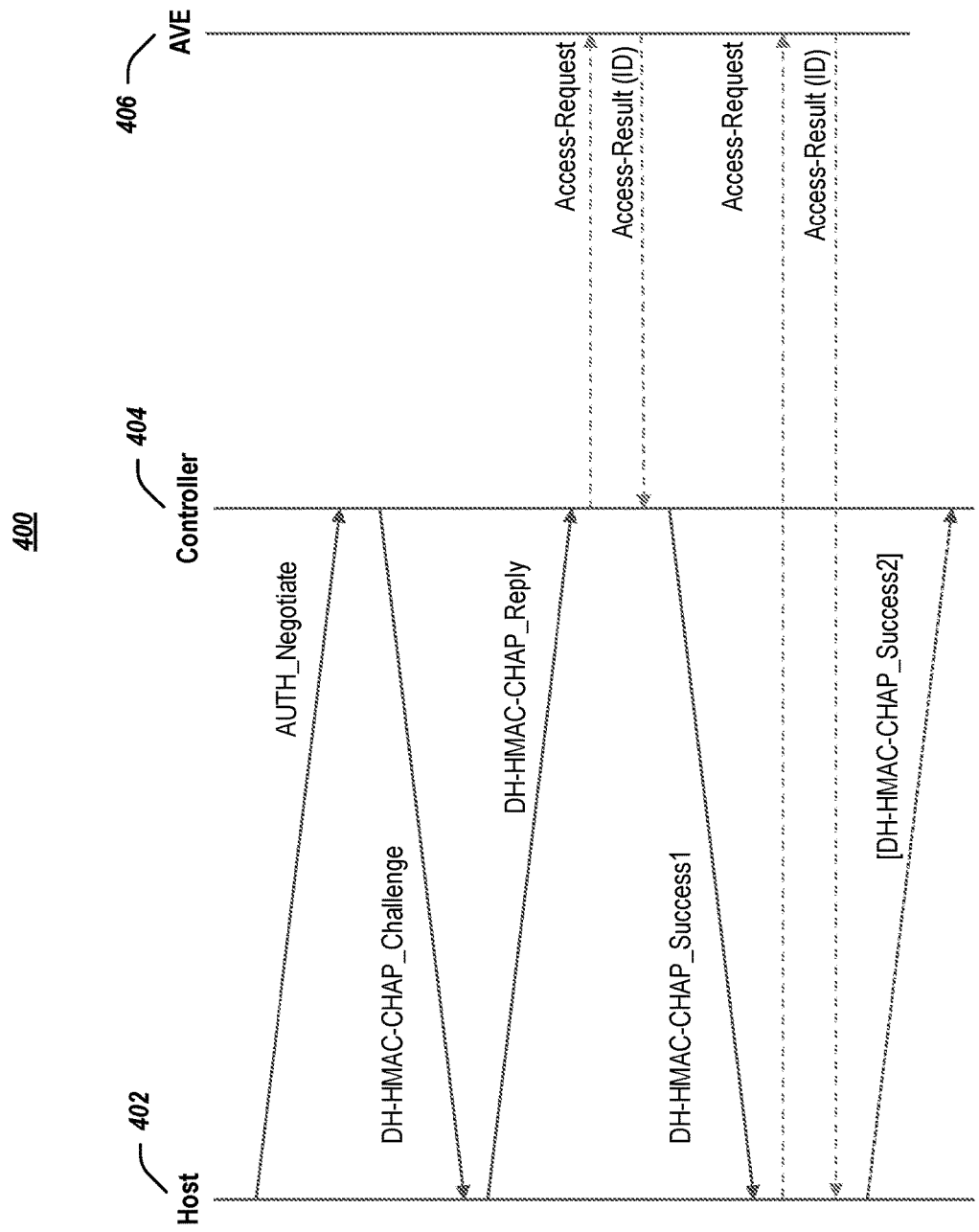
FIG. 4 is an example of DH-HMAC-CHAP authentication transaction with authentication verification being delegated to an Authentication Verification Entity (AVE).

FIG. 4 is an example of DH-HMAC-CHAP authentication transaction with authentication verification that has been delegated to an AVE. When AVE 406 is in use, provisioning DH-HMAC-CHAP becomes a much simpler task mainly because an NVMe-oF entity just needs to be provisioned with its own secret key (i.e., $K_e$) and the Pre-Shared Key (PSK) used to securely connect to AVE 406 (i.e., $PSK_{ea}$) that is identified by a unique NQN, $NQN_{AVE}$. In other words, when AVE 406 is used, an NVMe-oF entity merely needs the tuple $\{K_e, PSK_{ea}, NQN_{AVE}\}$, but does not need to be provisioned on a per-connection basis, which makes the AVE solution scalable.

Provisioning an authentication transaction followed by a TLS secure channel establishment, as shown in FIG. 2, requires specifying an additional piece of information, the TLS cipher suite(s), e.g., as defined based on either Secure Hash Algorithms (SHA)-256 or SHA-384. Since this information is not a per-connection parameter, using AVE 406 avoids provisioning on a per-connection basis also in the case of an authentication transaction that is followed by establishing a TLS secure channel.

The provisioning parameters described thus far enable an authentication transaction to be performed. However, whether an authentication transaction is performed or not is a matter of an entity's local policy that needs to be provisioned as well.

Table 1 shows authentication enablement policy definitions for a security policy host when only authentication is enabled, i.e., the authentication parameters that enable participation in an authentication transaction are provisioned, and when both authentication and TLS are enabled, i.e., the authentication parameters that enable participation and TLS cipher suite(s) are provisioned.

TABLE 1

| Host security policy | |
|---|---|
| Enablement | Policy |
| Nothing enabled | All prohibited |
| Authentication-only enabled | Authentication prohibited |
| | Authentication allowed |
| | Authentication required |
| Authentication + TLS enabled | Authentication prohibited, TLS prohibited |
| | Authentication allowed, TLS prohibited |
| | Authentication allowed, TLS allowed |
| | Authentication required, TLS prohibited |
| | Authentication required, TLS allowed |
| | Authentication required, TLS required |

Table 2 shows security policy definitions for a subsystem when only authentication is enabled, i.e., the authentication parameters are provisioned, and when authentication and TLS are enabled, i.e., the authentication parameters and TLS cipher suite(s) are provisioned. These policy definitions may determine the content of the relevant bits in the AUTHREQ field in the Connect response depicted in FIG. 1 and FIG. 2. The AUTHREQ field may contain two bits that indicate the absence of security requirements when the value is "00b," an authentication-only requirement when the value is "01b," and an "authentication and TLS" requirement when the value is "10b." These bits may be used together with the Secure Channel Concatenation (SC_C) parameter in an AUTH_Negotiate message (set to 00h to indicate no TLS concatenation, and set to 01h to request TLS concatenation) to determine interactions between a host and a controller, as shown in Table 3.

TABLE 2

| Subsystem security policy | | |
|---|---|---|
| Enablement | Policy | AUTHREQ |
| Nothing enabled | All prohibited | 00 |
| Authentication-only enabled | Authentication prohibited | 00 |
| | Authentication allowed | 00 |
| | Authentication required | 01 |
| Authentication + TLS enabled | Authentication prohibited, TLS prohibited | 00 |
| | Authentication allowed, TLS prohibited | 00 |
| | Authentication allowed, TLS allowed | 00 |
| | Authentication required, TLS prohibited | 01 |
| | Authentication required, TLS allowed | 01 |
| | Authentication required, TLS required | 10 |

TABLE 3

| Negotiated host behavior | | | |
|---|---|---|---|
| Controller Requirements (AUTHREQ) | Host Enablement | Host Policy | Host Behavior |
| 00b: Nothing required | Nothing enabled | All prohibited | No authentication |
| | Authentication-only enabled | Authentication prohibited | No authentication |
| | | Authentication allowed | No authentication |
| | | Authentication required | Begin authentication with SC_C = 00h |
| | Authentication + TLS enabled | Authentication prohibited, TLS prohibited | No authentication |
| | | Authentication allowed, TLS prohibited | No authentication |
| | | Authentication allowed, TLS allowed | No authentication |
| | | Authentication required, TLS prohibited | Begin authentication with SC_C = 00h |
| | | Authentication required, TLS allowed | Begin authentication with SC_C = 00h |
| | | Authentication required, TLS required | Begin authentication with SC_C = 01h |
| 01b: Authentication required | Nothing enabled | All prohibited | Disconnect |
| | Authentication-only enabled | Authentication prohibited | Disconnect |
| | | Authentication allowed | Begin authentication with SC_C = 00h |
| | | Authentication required | Begin authentication with SC_C = 00h |

TABLE 3-continued

Negotiated host behavior

| Controller Requirements (AUTHREQ) | Host Enablement | Host Policy | Host Behavior |
|---|---|---|---|
| | Authentication + TLS enabled | Authentication prohibited, TLS prohibited | Disconnect |
| | | Authentication allowed, TLS prohibited | Begin authentication with SC__C = 00h |
| | | Authentication allowed, TLS allowed | Begin authentication with SC__C = 00h |
| | | Authentication required, TLS prohibited | Begin authentication with SC__C = 00h |
| | | Authentication required, TLS allowed | Begin authentication with SC__C = 00h |
| | | Authentication required, TLS required | Begin authentication with SC__C = 01h |
| 10b: Authentication + TLS required | Nothing enabled | All prohibited | Disconnect |
| | Authentication-only enabled | Authentication prohibited | Disconnect |
| | | Authentication allowed | Disconnect |
| | | Authentication required | Disconnect |
| | Authentication + TLS enabled | Authentication prohibited, TLS prohibited | Disconnect |
| | | Authentication allowed, TLS prohibited | Disconnect |
| | | Authentication allowed, TLS allowed | Begin authentication with SC__C = 01h |
| | | Authentication required, TLS prohibited | Disconnect |
| | | Authentication required, TLS allowed | Begin authentication with SC__C = 01h |
| | | Authentication required, TLS required | Begin authentication with SC__C = 01h |

In one or more embodiments, the behavior specified in Table 3 may be used to facilitate the introduction of security in an NVMe-oF environment. The "allowed" values in the policy allow to commence an authentication transaction when both entities, e.g., host and subsystem are enabled in this manner. In general, this implies keeping a per-connection state. For example, a host may be enabled for authentication, but only a few of the subsystems that the host should connect to are enabled for authentication. Or a subsystem may be enabled for authentication, but only a few of the hosts connecting to the subsystem are enabled for authentication. In both cases, an NVMe-oF entity needs to be provisioned with a per-connection authentication policy to avoid authentication failures and operational disruptions. However, since provisioning on a per-connection basis does not scale, having to perform per-connection provisioning of security policies would nullify one of the main advantages of the AVE approach, i.e., the lack of a need for per-connection provisioning. Therefore, better methods and systems for specifying security policies in a centralized manner are needed to avoid the shortcomings of existing approaches that require per-connection provisioning.

Various embodiments herein provide systems and methods for authentication, and/or authentication with TLS, in an NVMe-oF environment, without disrupting fabric operation, and while taking advantage of centralized authentication verification through an AVE, i.e., without requiring per-connection provisioning of security policies in each NVMe-oF entity. In one or more embodiments, this is accomplished by leveraging an NVMe-oF Centralized Discover Controller (CDC) and NVMe-oF zoning as an elegant solution to introduce authentication methods in a centrally controlled manner. A CDC is used to facilitate discovery in a network, such as the SAN shown in FIG. 5, e.g., by providing IP fabric interface addresses of NVMe-oF subsystems that are registered with the CDC and that a host should connect to. The interface IP addresses may be provided to the CDC by a management system that may be controlled by an administrator.

In one or more embodiments, an authentication process may begin by providing security related information to an NVMe-oF entity, e.g., in the initial security provisioning step. As illustrated in Table 4, such information may comprise an entity key, $K_e$, an AVE identity, $NQN_{AVE}$, an entity PSK, $PSK_{ea}$, and, if selected, any TLS cipher suites, and a global policy of "allowed," e.g., for authentication-only and/or authentication and TLS.

TABLE 4

Global entity security policy.

| Enablement | Policy |
|---|---|
| Authentication-only enabled: $\{K_e, PSK_{ea}, NQN_{AVE}\}$ | Authentication allowed |
| Authentication + TLS enabled $\{K_e, PSK_{ea}, NQN_{AVE}\}$ + TLS cipher suite(s) | Authentication allowed, TLS allowed |

Figure 5:
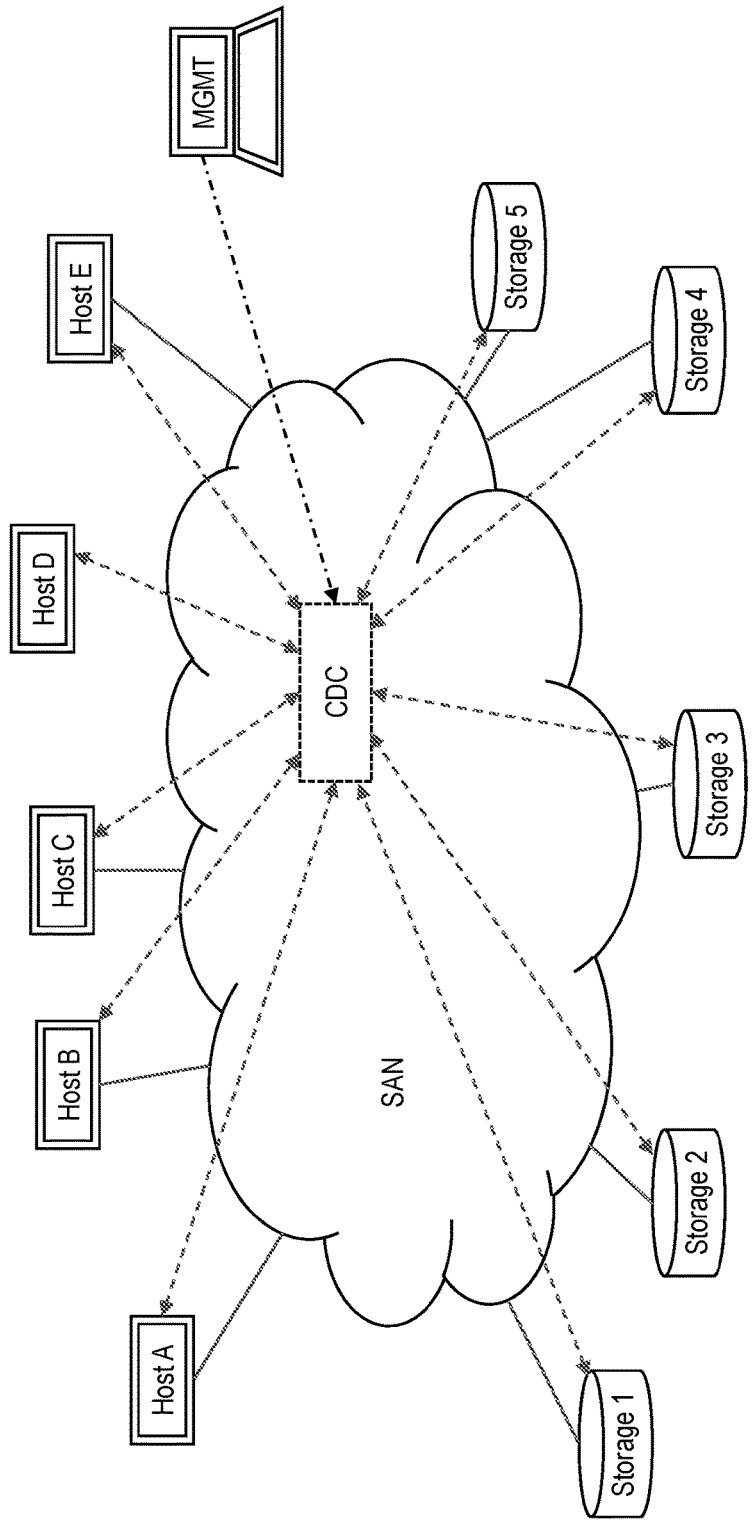
FIG. 5 depicts CDC connections in a SAN.

In one or more embodiments, the information in Table 4 enables provisioning of each NVMe-oF entity in FIG. 5 with security credentials and a global policy that may rely on an external trigger to initiate the authentication process. A suitable trigger may be defined as a Security Policy Zone Attribute in an NVMe-oF Zone.

Table 5 shows the structure of an NVMe-oF Zone, as defined in co-pending and commonly-owned U.S. patent application Ser. No. 17/194,251, filed on Mar. 6, 2021, entitled "Dynamic Connectivity Management Through Zone Groups," and listing Joseph LaSalle White, Erik Smith, Claudio Desanti, and Pawan Singal as inventors, which patent application is incorporated by reference herein in its entirety and for all purposes.

TABLE 5

Zone definition

| Bytes | Description |
|---|---|
| | Zone Name |
| | Number of zone members (x) |
| | Zone member #1 |
| | Zone member #2 |
| | ... |
| | Zone member #x |
| | Number of zone attributes (z) |
| | Zone attribute #1 |
| | Zone attribute #2 |
| | ... |
| | Zone attribute #z |

As shown in Table 5, a Zone may be defined as a list of Zone members that are allowed to communicate with each other, e.g., by virtue of being included in the Zone definition. In one or more embodiments, the Zone definition may comprise a list of Security Policy Zone attributes that may be defined, e.g., as TLV (Type, Length, Value) constructs or any other data structure. In one or more embodiments, a type may be allocated within a Security Policy Zone attribute TLV structure that defines a Security Policy Zone attribute, which may have certain values, e.g., such as those shown in Table 6.

TABLE 6

Security Policy Zone attribute values

| Value | Description |
|---|---|
| 00h | Nothing required |
| 01h | Authentication required |
| 02h | Authentication + TLS required |

In one or more embodiments, setting a Security Policy Zone attribute in a NVMe-oF Zone to, e.g., "00h" may be equivalent to not having the attribute in the Zone definition, i.e., no requirements are specified. Setting the Security Policy Zone attribute in a NVMe-oF Zone to "01h" may be the equivalent of specifying that the host members and the subsystem members of that Zone should authenticate each other. And setting the Security Policy Zone attribute in a NVMe-oF Zone to "02h" may be equivalent to specifying that the host members and the subsystem members of that Zone should authenticate each other and also establish a concatenated TLS secure channel between each other.

Figure 8:
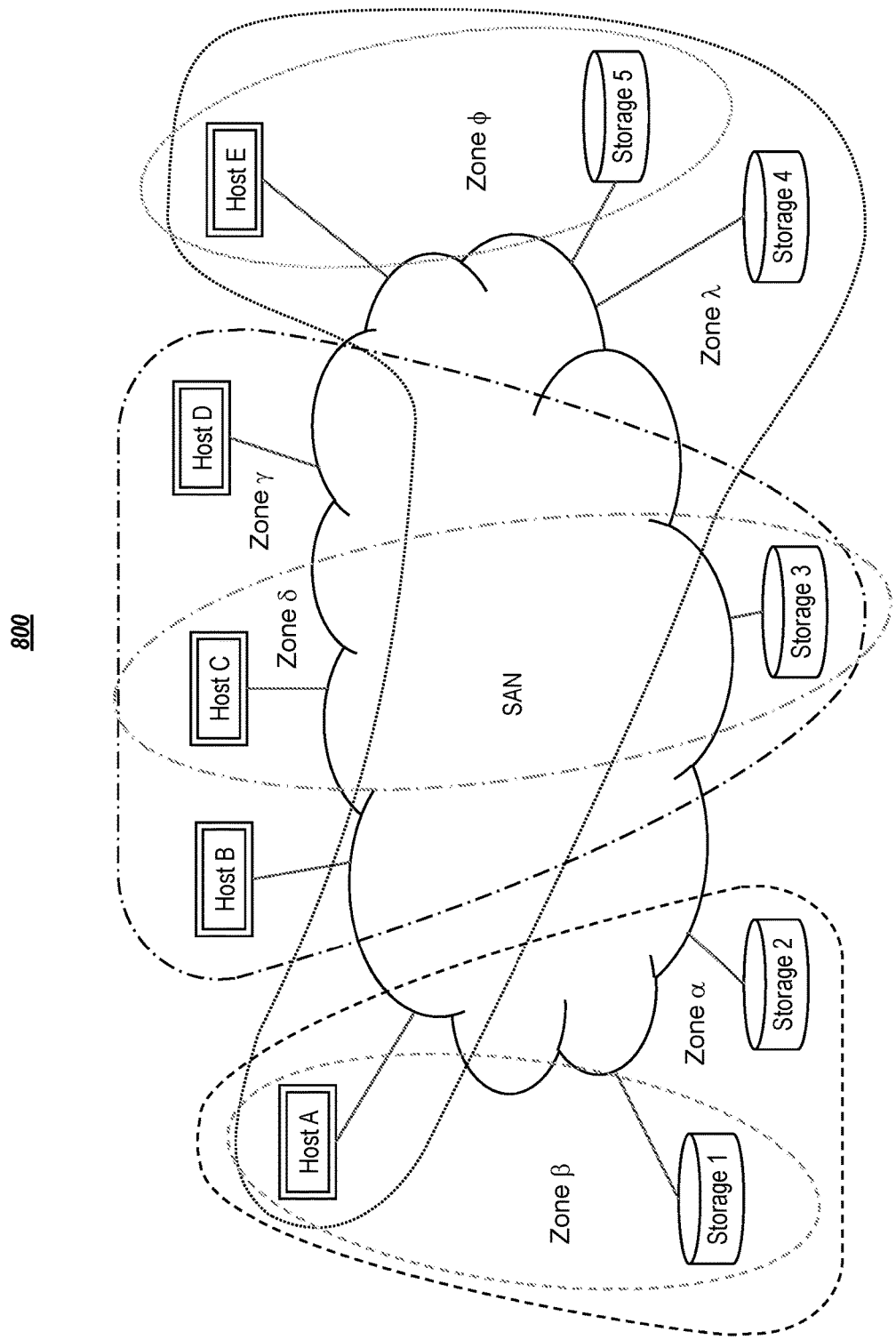
FIG. 8 depicts overlapping Security Zones according to embodiments of the present disclosure.

In one or more embodiments, the Security Policy Zone attribute allows an administrator to centrally specify which hosts and subsystems should authenticate each other as a "subset Zone" that may overlap with a defined Zone, discussed in greater detail with reference to FIG. 8. Such information may be communicated to hosts and subsystems, e.g., after a successful Get Log Page command, by using the Log Page Entry format. For example, as shown in Table 7, two bit values in a Transport Requirements (TREQ) field may be used to carry the same or similar semantic as the Security Policy Zone attribute.

TABLE 7

Log Page Entry TREQ field bits values

| Value | Description |
|---|---|
| 00b | Nothing required |
| 01b | Authentication required |
| 10b | Authentication + TLS required |

In one or more embodiments, when a host or subsystem issues a Get Log Page command to the CDC, the host (or subsystem) may obtain transport information according to subsystems or hosts that the host (or subsystem) is supposed to connect, including information on whether it should only authenticate or do both authenticate and also establish a secure TLS channel.

In one or more embodiments, timely notifications to hosts and subsystems of Security Policy Zone attribute changes may be achieved by utilizing an NVMe-oF Asynchronous Event Notification (AEN) mechanism.

Figure 6:
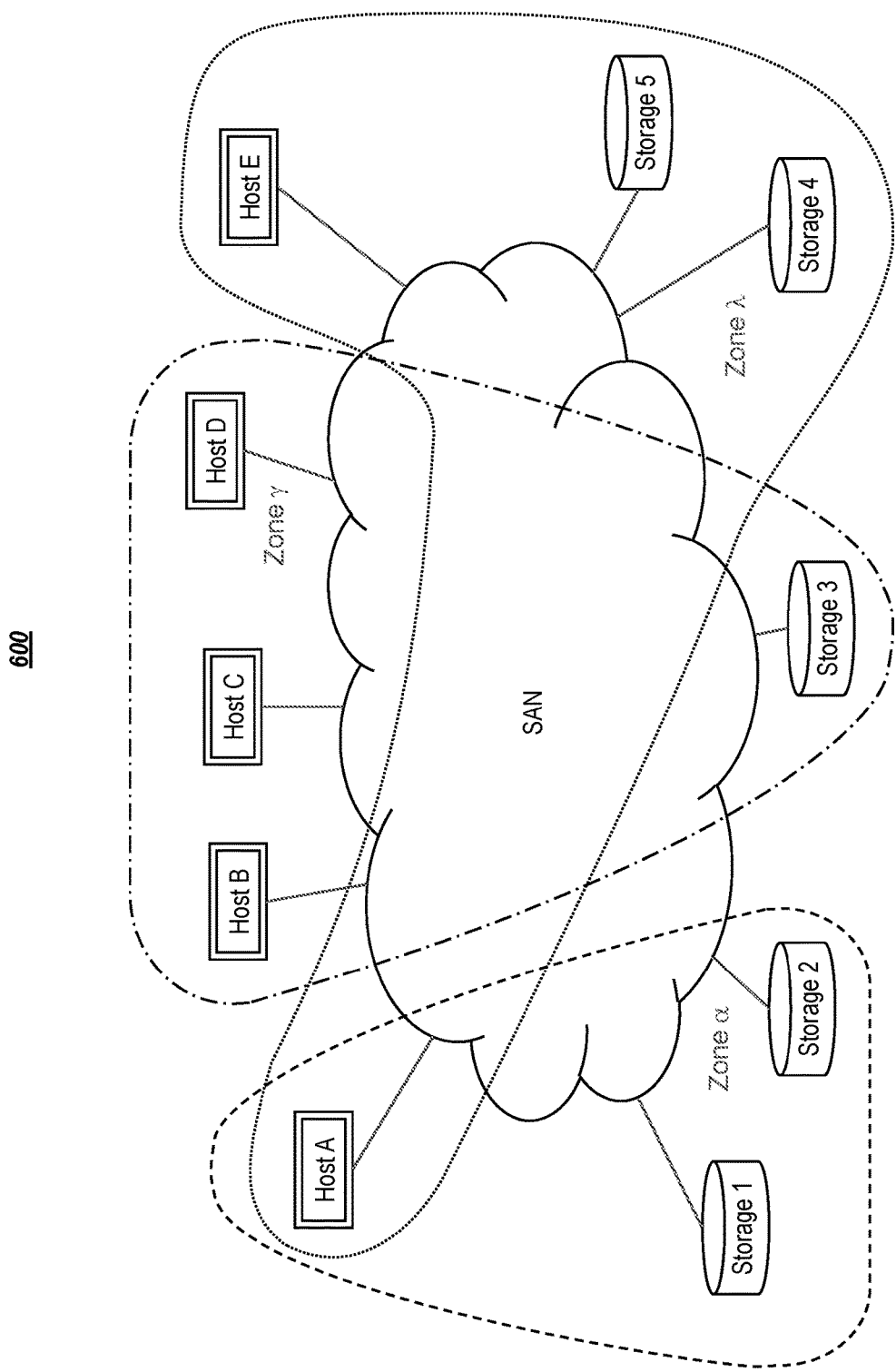
FIG. 6 depicts zones defined by a Zone Group according to embodiments of the present disclosure.
Figure 7:
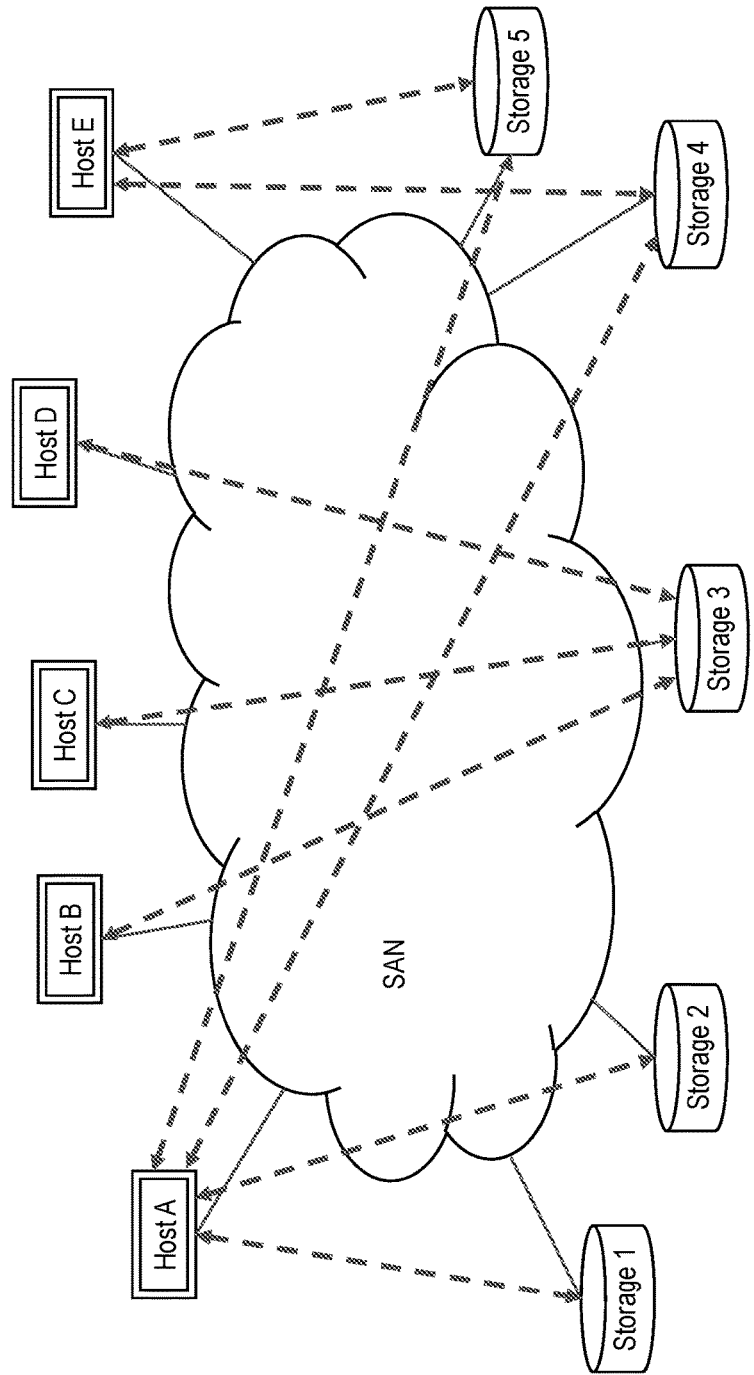
FIG. 7 depicts allowed connections between hosts and subsystems according to the zones shown in FIG. 6.

To demonstrate how Security Policy Zone attributes operate, Table 8 illustrates an example of a Zone Group definition that comprises three Zones, α, γ, and λ, as shown in FIG. 6. The configuration of Zones α, γ, and λ provides for allowed connections between hosts and subsystems that are shown in FIG. 7 as dashed double arrows.

TABLE 8

Example of Zones definition

| | Zone Group {Rome, NQN(CDC)} | | |
|---|---|---|---|
| Zone Name | α | γ | λ |
| Zone Members | {Host A, host} {Storage 1, subsystem} {Storage 2, subsystem} | {Host B, host} {Host C, host} {Host D, host} {Storage 3, subsystem} | {Host A, host} {Host E, host} {Storage 4, subsystem} {Storage 5, subsystem} |
| Zone Attributes | None | None | None |

Assuming that hosts A, C, and E and subsystems 1, 3, and 5 have been provisioned, i.e., enabled, for security according to the "allowed" global policy shown in Table 4, and further assuming that host A and E and subsystems 1 and 5 have been enabled for authentication only, and that host C and subsystem 3 have been enabled for authentication and TLS, in one or more embodiments, security processing may be defined by creating, e.g., in a ZoneDB, some overlapping "subset Zones" that comprise the appropriate value of the Security Policy Zone attribute. It is noted that by overlapping with the defined Zones and a subset of them, a "Security Zone" does not facilitate additional connectivity. Instead, in one or more embodiments, a "Security Zone" specifies security properties of selected connections.

Table 9 shows an example of Security Zones, expressed as separate Zone Groups. The ovals in FIG. 8 represent overlapping Security Zones β, δ, and φ defined in Table 9.

TABLE 9

Example of Security Zones definition

| | Zone Group {Auth-Rome, NQN(CDC)} | | |
|---|---|---|---|
| Zone Name | β | δ | φ |
| Zone Members | {Host A, host} {Storage 1, subsystem} | {Host C, host} {Storage 3, subsystem} | {Host E, host} {Storage 5, subsystem} |
| Zone Attributes | Security Policy Value: 01h | Security Policy Value: 02h | Security Policy Value: 01h |

The active Zoning configuration may change upon activation of the Zone Group "Auth-Rome" shown in Table 9. As a result, in one or more embodiments, a CDC, which may have its own unique NQN, may send an AEN to the affected hosts and subsystems, here, hosts A, C, and E and subsystems 1, 3, and 5. The affected entities may then respond to the AEN, e.g., by issuing a Get Log Page command to the CDC to determine what changed. In a reply Log Page sent by the CDC, the relevant TREQ bits may provide to the affected entities, e.g., the security policy requirements that may have been specified by an administrator for the Zone Group "Auth-Rome."

For example, Host A may detect that authentication is required to connect to Storage 1; Storage 1 may detect that authentication is required to connect to Host A; Host C may detect that authentication and TLS is required to connect to Storage 3; Storage 3 may detect that authentication and TLS is required to connect to Host C; Host E may detect that authentication is required to connect to Storage 5; and Storage 5 may detect that authentication is required to connect to Host E.

Figure 9:
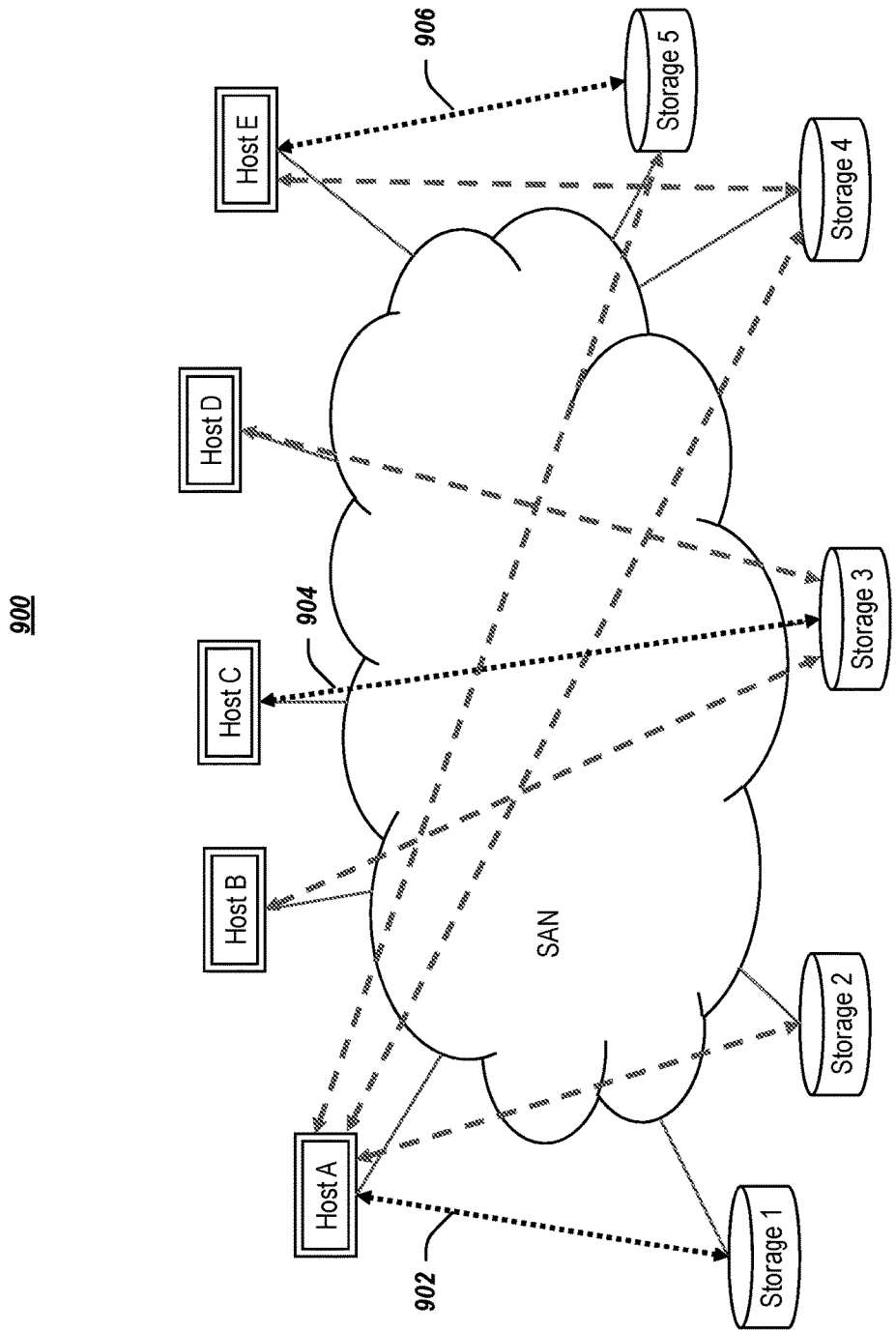
FIG. 9 depicts secured connections according to embodiments of the present disclosure.

In one or more embodiments, this information may be stored by the affected entities as a more specific security policy rule with respect to the global security policy. It is noted that this is similar to how a more specific (and dynamically learned) route may override a (static) default route. This allows Hosts A, C, and E to begin an authentication transaction to secure the connection and subsystems 1, 3, and 5 to provide this information in the AUTHREQ field of the Connect response for subsequent Connect requests. The resulting secured connections 902, 904, and 906 are represented in FIG. 9.

Advantageously, on one or more embodiments, the described per-connection security policy rules may be automatically derived from the NVMe-oF protocol execution and are not per-connection rules that have been administratively configured for each entity. As a result, the avoidance of per-connection provisioning allowed by the AVE may be preserved also for security policies configuration.

FIG. 10 is a flowchart of an illustrative centralized access control process for authenticating entities in an NVMe-oF environment in accordance with various embodiments of the present disclosure. In one or more embodiments, a centralized access control process (1000) may begin when e.g., at a CDC of an NVMe-oF SAN that comprises NVMe-oF entities, such as NVMe-oF hosts and NVMe-oF controllers, a zone configuration is defined (1005). In one or more embodiments, the zone configuration may represent a set of access control rules that determine which NVMe-oF host can connect to which NVMe-oF controller. In one or more embodiments, each NVMe-oF entity may be configured with a per-entity global security policy that comprises a security credential and that enables an authentication and/or a secure channel communication between two or more NVMe-oF entities.

In one or more embodiments, once an NVMe-oF entity issues a request for discovery information to the CDC, such as an NVMe Get Log Page request, e.g., to discover those entities that the NVMe-oF entity can establish a communication with according to the zone configuration, the CDC may provide (1010) to the NVMe-oF entity a list of those entities. The CDC may further provide transport information, e.g., in a TREQ field, to specify the enabled authentication and/or secure channel communication.

It is noted that: (1) certain steps may optionally be performed; (2) steps may not be limited to the specific order set forth herein; (3) certain steps may be performed in different orders; and (4) certain steps may be done concurrently.

Figure 11:
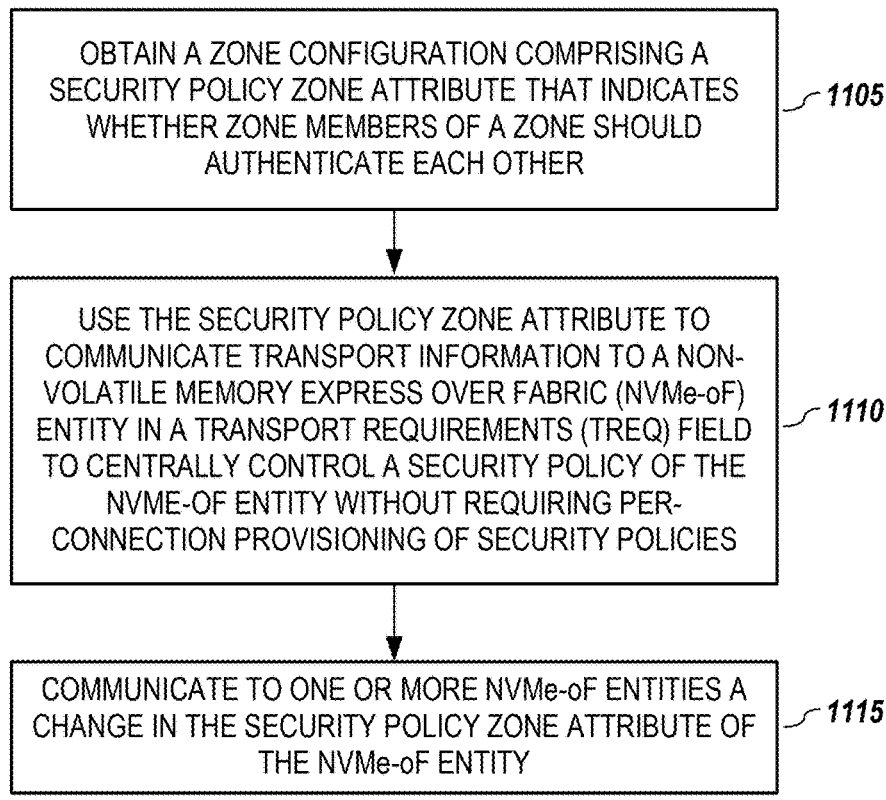
FIG. 11 is a flowchart of another illustrative centralized access control process for authenticating entities in an NVMe-oF environment according to embodiments of the present disclosure.

FIG. 11 is a flowchart of another illustrative centralized access control process for authenticating entities in an NVMe-oF environment in accordance with various embodiments of the present disclosure. In one or more embodiments, access control process (1100) may begin when a CDC obtains (1105) a zone configuration that may comprise a security policy zone attribute. The security policy zone attribute may be defined, e.g., in a TLV field of a zone definition, and may indicate whether zone members of a zone should authenticate each other.

In one or more embodiments, the CDC may use (1110) the security policy zone attribute to communicate transport information to an NVMe-oF entity, e.g., in a TREQ field discussed with reference to Table 7 above. The transport information may be used to centrally control a security policy of the NVMe-oF entity, advantageously, without requiring per-connection provisioning of security policies.

It is understood that, in one or more embodiments, the security policy may be prioritized over the global security policy. It is further understood, that the CDC may use an AEN procedure to communicate (1115) to any number of NVMe-oF entities a change in the security policy zone attribute of the NVMe-oF entity and that the AEN procedure may be used to activate a zone group formed by two or more NVMe-oF zones.

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices, such as a keyboard, mouse, stylus, touchscreen, and/or video display. The computing system may also include one or more buses operable to transmit communications between the various hardware components.

Figure 12:
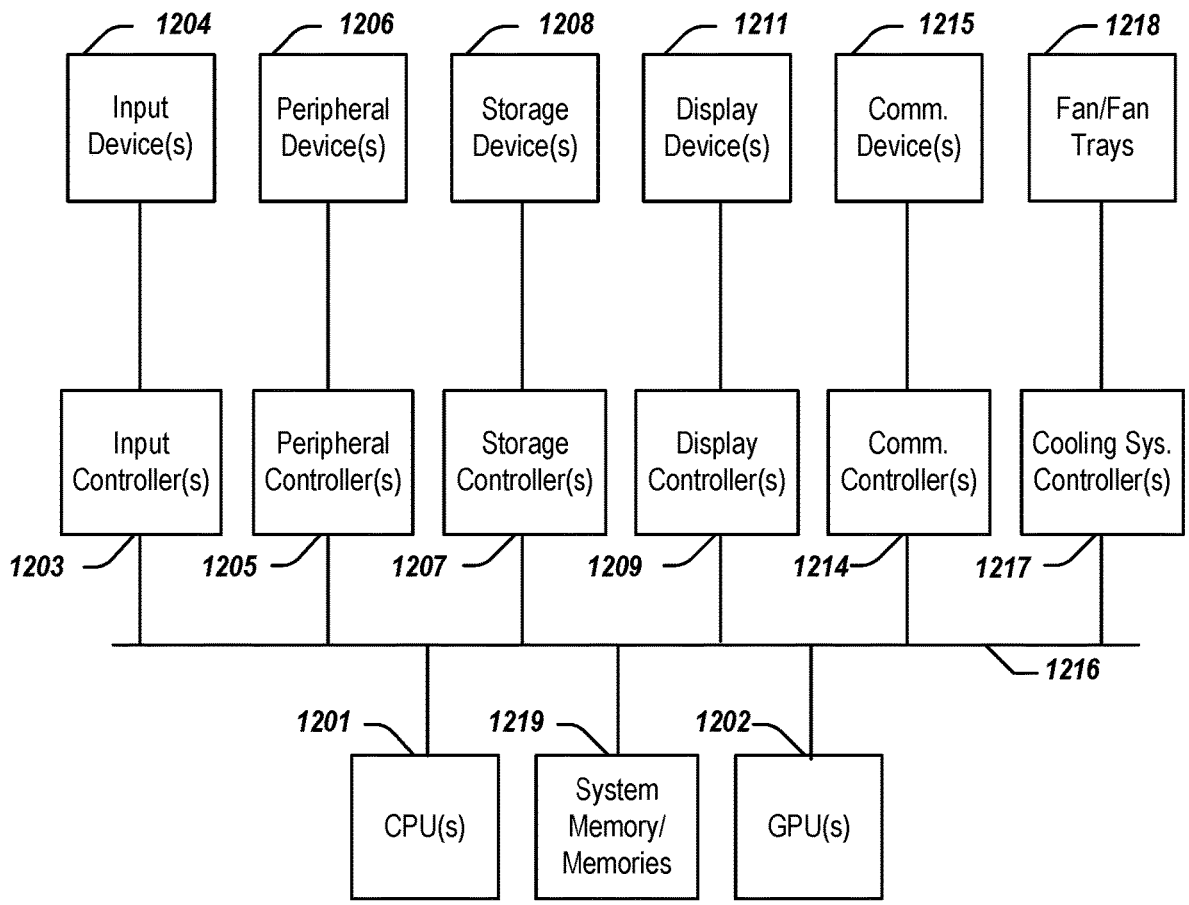
FIG. 12 depicts a simplified block diagram of an information handling system, according to embodiments of the present disclosure.

FIG. 12 depicts a simplified block diagram of an information handling system (or computing system), according to embodiments of the present disclosure. It will be understood that the functionalities shown for system 1200 may operate to support various embodiments of a computing system—although it shall be understood that a computing system may be differently configured and include different components, including having fewer or more components as depicted in FIG. 12.

As illustrated in FIG. 12, the computing system 1200 includes one or more central processing units (CPU) 1201 that provides computing resources and controls the computer. CPU 1201 may be implemented with a microprocessor or the like and may also include one or more graphics processing units (GPU) 1202 and/or a floating-point coprocessor for mathematical computations. In one or more embodiments, one or more GPUs 1202 may be incorporated within the display controller 1209, such as part of a graphics card or cards. The system 1200 may also include a system memory 1219, which may comprise RAM, ROM, or both.

A number of controllers and peripheral devices may also be provided, as shown in FIG. 12. An input controller 1203 represents an interface to various input device(s) 1204, such as a keyboard, mouse, touchscreen, and/or stylus. The computing system 1200 may also include a storage controller 1207 for interfacing with one or more storage devices 1208 each of which includes a storage medium such as magnetic tape or disk, or an optical medium that might be used to record programs of instructions for operating systems, utilities, and applications, which may include embodiments of programs that implement various aspects of the present disclosure. Storage device(s) 1208 may also be used to store processed data or data to be processed in accordance with the disclosure. The system 1200 may also include a display controller 1209 for providing an interface to a display device 1211, which may be a cathode ray tube (CRT) display, a thin film transistor (TFT) display, organic light-emitting diode, electroluminescent panel, plasma panel, or any other type of display. The computing system 1200 may also include one or more peripheral controllers or interfaces 1205 for one or more peripherals 1206. Examples of peripherals may include one or more printers, scanners, input devices, output devices, sensors, and the like. A communications controller 1214 may interface with one or more communication devices 1215, which enables the system 1200 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a SAN or through any suitable electromagnetic carrier signals including infrared signals. As shown in the depicted embodiment, the computing system 1200 comprises one or more fans or fan trays 1218 and a cooling subsystem controller or controllers 1217 that monitors thermal temperature(s) of the system 1200 (or components thereof) and operates the fans/fan trays 1218 to help regulate the temperature.

In the illustrated system, all major system components may connect to a bus 1216, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 13:
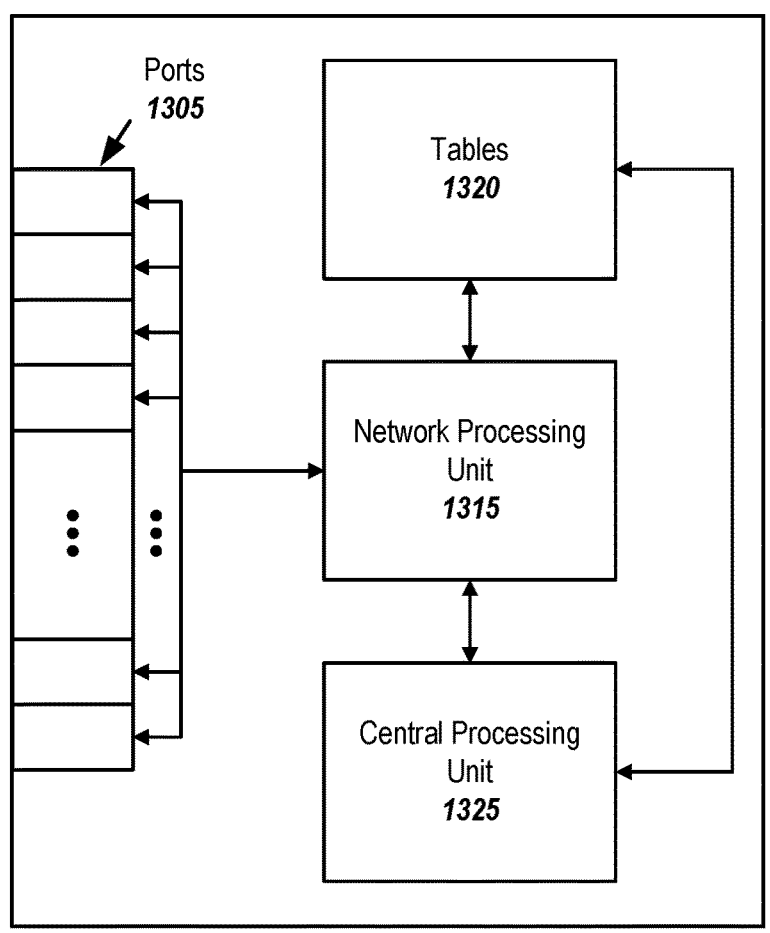
FIG. 13 depicts an alternative block diagram of an information handling system, according to embodiments of the present disclosure.

FIG. 13 depicts an alternative block diagram of an information handling system, according to embodiments of the present disclosure. It will be understood that the functionalities shown for system 1300 may operate to support various embodiments of the present disclosure although it shall be understood that such system may be differently configured and include different components, additional components, or fewer components.

The information handling system 1300 may include a plurality of I/O ports 1305, a network processing unit (NPU) 1315, one or more tables 1320, and a central processing unit (CPU) 1325. The system includes a power supply (not shown) and may also include other components, which are not shown for sake of simplicity.

In one or more embodiments, the I/O ports 1305 may be connected via one or more cables to one or more other network devices or clients. The network processing unit 1315 may use information included in the network data received at the node 1300, as well as information stored in the tables 1320, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A centralized discovery controller (CDC) in a Non-Volatile Memory express over Fabric (NVMe-oF) environment, the CDC comprising:
one or more processors; and
a non-transitory computer-readable medium or media comprising one or more sets of instructions which, when executed by at least one of the one or more processors, causes steps to be performed comprising:
at the CDC of an NVMe-oF network, receiving a zone configuration comprising one or more authentication policy zone attributes that indicate, for a zone member of a zone, an authentication requirement or requirements when establishing a connection or connections with one or more other zone members of the zone;
using at least part of the authentication policy zone attributes in a response to a discovery request from a first NVMe entity, in which the response communicates zoning-controlled information to the first NVMe entity comprising:
an identification of a second NVMe entity that is defined as a zone member of the first NVMe entity to which the first NVMe entity is authorized to connect; and
an authentication requirement identifier that indicates to the first NVMe entity one of the following authentication requirements comprising whether:
(1) establishing a connection with the second NVMe entity comprises authentication; or
(2) establishing a connection with the second NVMe entity comprises authentication and establishment of a secure channel;
responsive to a change to the one or more authentication policy zone attributes, sending a notification to an NVMe entity affected by the change; and
responsive to receiving a request from the affected NVMe entity to receive change information related to the notification, sending to the affected NVMe entity a response to the request, the response comprising at least one indicator of the change to the one or more authentication policy zone attributes.

2. The CDC of claim 1, wherein the first NVMe entity is:
a host information handling system and the second NVMe entity is a storage system, or
the first NVMe entity is a storage system and the second NVMe entity is a host information handling system.

3. The CDC of claim 1, wherein:
a notification is sent to each NVMe entity affected by the change to the one or more authentication policy zone attributes.

4. The CDC of claim 3, wherein the notification sent to each NVMe entity affected by the change to the one or more authentication policy zone attributes comprises:
responsive to the change at the CDC to the one or more authentication policy zone attributes, sending an asynchronous event notification to each NVMe entity affected by the change; and
responsive to receiving a request, from one NVMe entity of the each NVMe entity affected by the change, to receive from the CDC change information, sending a reply to the one NVMe entity that comprises the authentication requirement including the change to the one or more authentication policy zone attributes.

5. The CDC of claim 1, wherein the change is related to an authentication requirement for one or more zone members of the zone to which the affected NVMe entity is a member.

6. The CDC of claim 1, wherein the authentication requirement identifier is included in one or more fields.

7. The CDC of claim 6, wherein the one or more fields comprises using a transport requirements field or fields.

8. A method comprising:
receiving, at a centralized service, a configuration comprising an authentication policy zone attribute for zone members of a zone, in which the authentication policy zone attribute indicates an authentication requirement including whether establishing a connection between two zone members of the zone comprises: (1) authentication; or (2) authentication and establishing of a secure channel communication;
for each requesting Non-Volatile Memory express (NVMe) entity that is a member of the zone that makes a discovery request to the centralized service, sending from the centralized service a reply that comprises:
a list of one or more zone members of the zone; and
an authentication requirement identifier that communicates to the requesting NVMe entity the authentication requirement indicated by the authentication policy zone attribute when connecting with one or more other NVMe entities of the zone,
responsive to receiving a change to the authentication policy zone attribute, sending a notification to each NVMe entity affected by the change; and
responsive to receiving a request, from one NVMe entity of the each NVMe entity affected by the change, to receive change information related to the change, sending to the one NVMe entity a response to the request, the response comprising at least one indicator of the change to the authentication policy zone attribute.

9. The method of claim 8, wherein the centralized service is a centralized discovery controller (CDC), which uses an asynchronous event notification procedure to communicate to one or more zone members receipt by the CDC of the configuration.

10. The method of claim 8, wherein at least some NVMe entities that are zone members of the zone have undergone authentication provisioning that facilitate:
authentication, or
authentication and establishing a secure channel.

11. The method of claim 9, wherein the CDC communicates the authentication requirement which indicates the authentication policy zone attribute to the requesting NVMe entity in a get log page response that comprises a list of one or more NVMe entities that are members of the zone and a corresponding indicator or corresponding indicators of their authentication policy zone attribute or attributes, if any.

12. The method of claim 10, wherein the authentication provisioning comprises implementing at least one of an entity key, an authentication verification entity (AVE) identity, an entity pre-shared key (PSK), or a transport layer security (TLS) cipher suite.

13. The method of claim 8, wherein the authentication requirement identifier comprises an indicator or indicators in a field or fields.

14. The method of claim 13, wherein the indicator or indicators are included in a transport requirements field or fields of a get log page response.

15. The method of claim 8, wherein the requesting NVMe entity is a host information handling system or a storage system.

16. A processor-implemented method comprising:
- at a centralized discovery controller (CDC) of a Non-Volatile Memory express (NVMe) environment, storing a zone configuration comprising:
  - a set of NVMe entities that are identified as being members of a zone; and
  - for at least one NVMe entity in the set of NVMe entities that are identified as being members of the zone, an authentication attribute that identifies an authentication requirement for the at least one NVMe entity;
- in response to receiving from a requesting NVMe entity a request to discover information related to the requesting NVMe entity, providing to the requesting NVMe entity:
  - a list of one or more NVMe entities that are members of the zone, and,
  - for at least one of the NVMe entities on the list, an identifier of the authentication requirement that indicates to the requesting NVMe entity whether establishing a connection with the at least one of the NVMe entities comprises:
    - (1) authentication; or
    - (2) authentication and establishment of a secure channel;
- in response to receiving a change to the authentication requirement, notifying one or more NVMe entities affected by the change; and
- in response to receiving a request, from one NVMe entity of the one or more NVMe entities affected by the change, to receive change information related to the change, sending to the one NVMe entity a response to the request, the response comprising at least one indicator of the change to the authentication requirement.

17. The processor-implemented method of claim 16, wherein at least some of the NVMe entities of the set of NVMe entities have been configured with one or more authentication credentials that facilitate implementing an authentication setting of: (1) authentication, (2) establishing of a secure channel, or (3) both.

18. The processor-implemented method of claim 16, wherein the step of providing to the requesting NVMe entity a list of one or more NVMe entities that are members of the zone, and, for at least one of the NVMe entities on the list, providing an identifier of the authentication requirement indicating to the requesting NVMe entity whether establishing a connection with the at least one of the NVMe entities comprises: (1) authentication; or (2) authentication and establishment of a secure channel, comprises:
- sending a discovery response to the discovery request received from the requesting NVMe entity, wherein the identifier is included in a field or fields of the discovery response.

19. The processor-implemented method of claim 16, wherein the authentication attribute controls one or more authentication policies of the at least one NVMe entity of the zone without requiring per-connection provisioning of the one or more authentication policies.

20. The processor-implemented method of claim 16, wherein the authentication credentials comprise at least one of an entity key, an authentication verification entity (AVE) identity, an entity pre-shared key (PSK), or a transport layer security (TLS) cipher suite.

* * * * *